April 21, 1931.  A. BOYNTON  1,801,482
MILLING TOOL
Filed Oct. 27, 1925   2 Sheets-Sheet 1
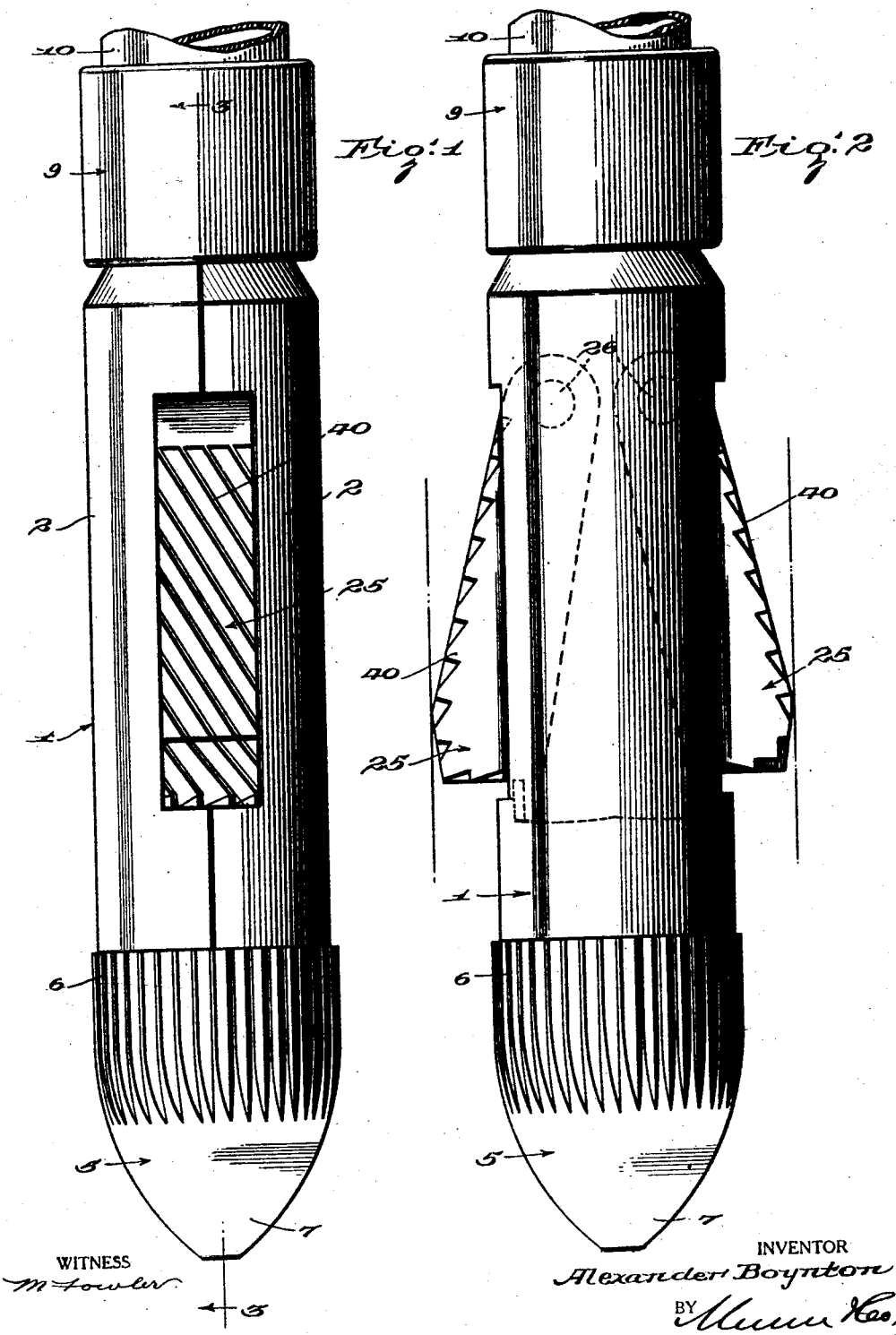
INVENTOR
Alexander Boynton
BY
ATTORNEYS April 21, 1931. A. BOYNTON 1,801,482
MILLING TOOL
Filed Oct. 27, 1925 2 Sheets-Sheet 2
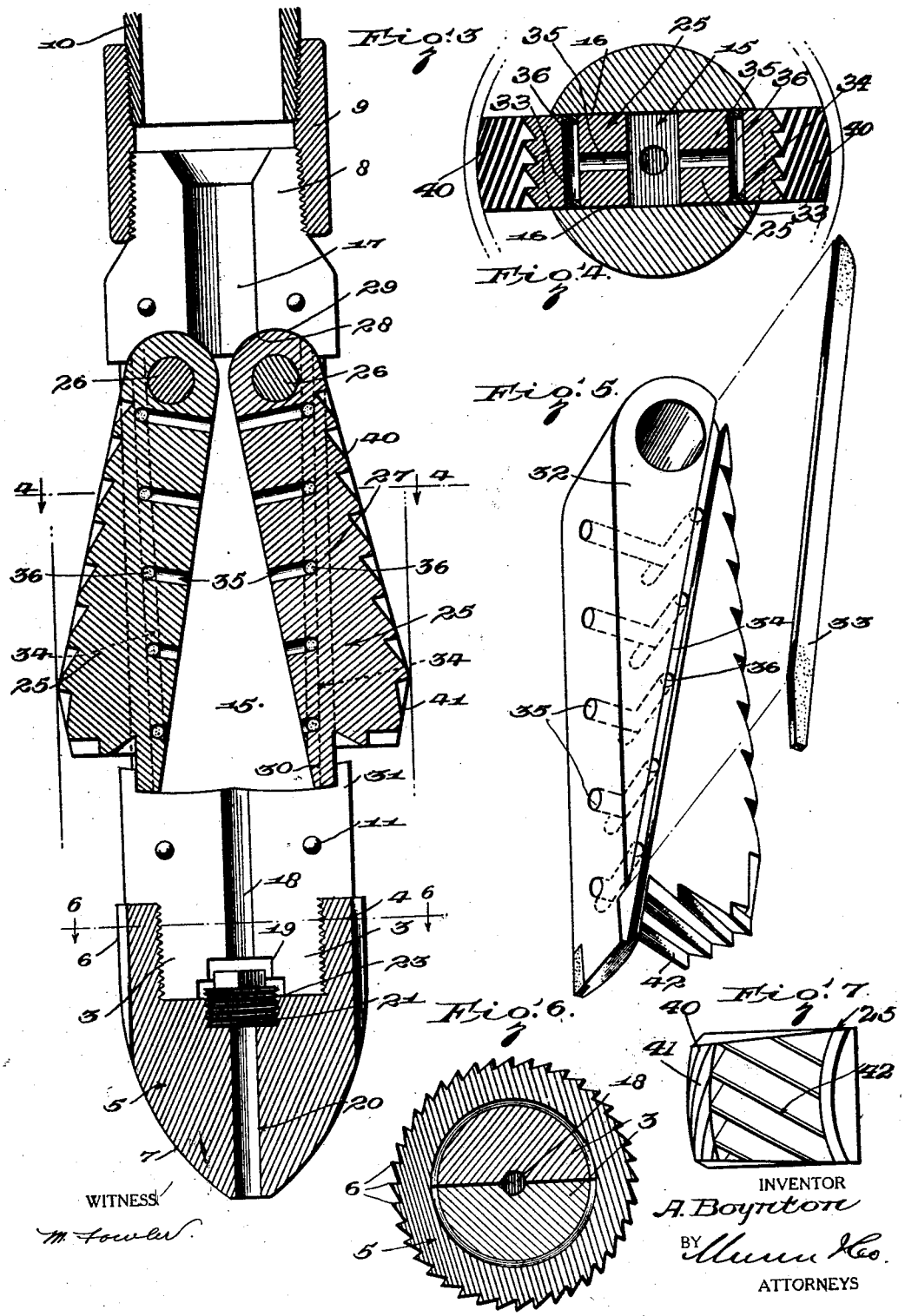
INVENTOR
A. Boynton
BY
ATTORNEYS Patented Apr. 21, 1931

1,801,482

UNITED STATES PATENT OFFICE

ALEXANDER BOYNTON, OF SAN ANTONIO, TEXAS

MILLING TOOL

Application filed October 27, 1925. Serial No. 65,222.

This invention relates to a milling tool especially adapted for use in milling away the casing of oil, gas and water wells or in milling away projecting boulders or shelves of rock occurring in the well hole and which have not been entirely cut away by the drill bits.

One of the principal objects of the invention is to provide a milling tool of this character which carries out the cutting operation in such manner as to discharge the cuttings downwardly or outwardly and downwardly between the well casing and the wall of the well hole, precluding the possibility of the cuttings building up between the cutting blades and the casing and forming an impaction liable to result in sticking of the tool. Along with this advantage the cutting action is so carried out that an upward thrust is exerted on the drill stem. Such thrust is counteracted by the weight of the drill stem and this feature has the very material advantage of precluding the imposition of strains on the drill stem which acting in conjunction with the weight of the stem would be liable to stretch and break the same in two.

A further object resides in the provision of a milling tool which may be used to mill away the casing by virtue of the outward swinging of its blades in the first instance and the downward feeding of the tool thereafter.

A still further object resides in the provision of a milling tool having these advantages and capacities wherein blades are swung outwardly by fluid pressure.

Another object resides in the provision of a milling tool of the character specified and which is of simple and durable construction, reliable and effective in operation and easy and comparatively inexpensive to manufacture.

Other objects and advantages reside in certain novel features in the construction, arrangement and combination of parts which will be hereinafter more particularly described and pointed out in the appended claims, reference being had to the accompanying drawings forming part of this specification, and in which, Figure 1 is a view in side elevation showing an embodiment of the invention taken at right angles to Figure 1.

Figure 2 is a similar view taken at right angles to Figure 1.

Figure 3 is a sectional view on line 3—3 of Figure 1.

Figure 4 is a view in horizontal section on line 4—4 of Figure 3.

Figure 5 is a group view in perspective of one of the swingable milling blades and one of its packing strips.

Figure 6 is a view in horizontal section on line 6—6 of Figure 3.

Figure 7 is a bottom plan view of one of the milling blades.

Referring to the drawings wherein for the sake of illustration is shown one embodiment of the invention, it will be seen that the outwardly swingable milling tool comprises a cylindrical body portion designated generally at 1 and made up of two similar semi-cylindrical sections 2. At their forward or lower ends sections 2 have reduced extensions 3 which are externally threaded and are engaged with internal threads on an annular flange 4 provided on a milling shoe 5. The lower reduced extension defines a shoulder with which the flange abuts.

The milling shoe 5 is slightly larger than the body portion 1 and has a cylindrical section formed with parallel longitudinal swedging ribs 6 designed to swedge out bended or partially collapsed pipe or casing. The cylindrical section of the milling shoe merges into a tapering forward section 7 which may be of conical form and which in any event gradually tapers to a blunt point. The rear or upper ends of the sections 2 are also formed with reduced extensions 8 having external threads cooperable with the internal threads of a coupling sleeve 9 serving to connect the milling tool to the lower end of a drill stem 10. From this it will be understood that the coupling sleeve 9 and the flange 4 hold the sections 2 together. To supplement the action of these parts and to hold the sections of the tool together while these parts are being assembled with the sections, one of the sections 2 is provided with studs or pins 11 designed to fit in openings or sockets provided therefor in the other section whereby to hold the sections against longitudinal or lateral displacement with respect to each other.

Intermediate their ends the sections 2 are recessed or cut away to provide a blade receiving chamber 15 which has flat, smooth and parallel side walls 16. The upper end of the chamber 15 communicates with an axial passage 17 leading up and into the hollow drill stem. The lower end of the chamber 15 communicates with a somewhat smaller axial passage 18 having an enlarged portion 19 adjacent the milling shoe 5. The milling shoe 5 has an axial passage 20 enlarged and internally threaded at one end as at 21. A plug 23 may be engaged with the enlarged and internally threaded portion 21 of the passage 20 and is partially accommodated in the enlarged passage 19 of the passage 18. This plug is used when it is desired to shut off the flow of water or other fluid down through the passage 20 but it may be removed when circulation down through the milling shoe is desirable.

A pair of milling blades designated generally at 25 is provided. The blades 25 are mounted for swinging movement on pivot pins 26 extending transversely of the chamber 15 at its upper end. The blades 25 are of identical construction and each comprises a body portion 27 terminating in a rounded upper end 28 which snugly fits in a rounded recess 29 provided therefor in the body portion of the milling tool. The lower end of each blade terminates in a downwardly extending marginal lip 30 along the inner edge of the blade. The lips 30 of the blades are engageable with upstanding flanges 31 provided on the body portion of the milling tool and these parts 30 and 31 coact to limit the outward swinging movements of the blades. The blades have their pivoted ends spaced from each other as shown in Figure 3 in order that the fluid pressure which is pumped down through the hollow drill stem may pass from the passage 17 into the chamber 15 between the blades.

Packing means is provided between the side faces 32 of the blades and the parallel side walls 16 of the chamber 15 and these packing means includes a packing strip 33 for each side face 32 of each blade, each packing strip 33 being snugly fitted in a slot 34 provided therefor in the side of the blade with which it is associated. The slots 34 extend only part-way into the body of the blade but open out through the side faces thereof and also open out through the curved upper end wall of the blade and through the back wall thereof at the juncture of the back wall and lip 30.

It is proposed to utilize the fluid pressure employed for swinging the blades outwardly to cause the packing strips 33 to have more effective engagement with the walls 16 with which they coact and for this purpose each blade has a plurality of lateral openings 35 opening through the rear faces of the blades and communicating with the chamber 18 and also communicating with transverse passages 36 formed in the blade body and opening through the bottom walls of the slots 34 thereof. In this way the fluid pressure acts on the under sides of the packing strips 33 and forces these packing strips out against the walls 16. The outer face of each blade 25 is provided with a plurality of milling teeth 40 which slope or incline downwardly and across the face of the blade in such manner in respect to the direction of rotation as to force the cuttings downwardly and outwardly, thereby discharging the cuttings down into the well casing or down between the well casing and the wall of the well hole. This has the distinct advantage over arrangements wherein the cuttings are discharged upwardly as with such arrangements the cuttings are liable to build up an impaction causing the tool to stick. This arrangement has a further advantage in that the result of its disposition of the teeth is the exertion of an upward thrust on the drill stem which is counteracted by the weight of the drill stem. The advantage of this feature is that the force which the thrust represents is counteracted by the weight and not added to the weight which would result in a stretching and possible breaking of the drill stem. The outer face of each blade 25 on which the teeth 40 are formed inclines downwardly and outwardly as a whole from its upper end to a point adjacent but spaced from its lower end. The lower portion of the outer face of each blade slopes inwardly as indicated at 41.

By providing an inwardly inclining section on the lower end of the outer face of each blade, once the milling tool is inserted into the casing the blades cannot hang up upon joints or imperfections in the casing. In addition to the teeth on the outer face of each blade, each blade has a lower face provided with teeth 42 which incline across the lower face of the blade and merge into certain of the teeth 40 on the outer face of the blade. The teeth 42 are so inclined across the lower face of the blade with respect to the direction of rotation as to cause the cuttings to be forced outward and thereby cause these cuttings to settle down between the well casing and the wall of the well hole.

In operation the milling tool is lowered down into the casing to the point where it is desirable to mill through the casing. The drill stem is then rotated and fluid pressure is pumped down through the hollow drill stem. The fluid pressure acting on the inner faces of the blades swings the same outward as the drill stem rotates. After the pipe or casing has been cut in two and the milling blades have become extended as far as they may be the operator then feeds the drill stem downward slowly. The milling action is on the sides of the blades until they open. After they open the milling action is on the bottom of the blades. As has been pointed out the slope of the teeth on the sides is such that the cuttings will be forced downward thereby preventing the tool from becoming wedged in below the cuttings. Also the slope of the teeth on the bottom of the blades is in such direction that the cuttings will be drawn outward and will settle down upon the outside of the casing. The advantages of this particular action have been discussed above.

Frequently wells have the casing cemented in them at depths which seal off one or more oil sands. This milling tool can be used to remove the casing from opposite such oil sands. After the casing has been milled away from opposite the oil sands, a rotary reamer may be used to still further open the formation, and thereby add to the productivity of the oil bearing horizon. This applies equally to gas wells or water wells.

It furthermore often happens that a string of casing while being placed in a well lands upon a projecting boulder or shelf of rock, which was not sufficiently cut away by the drill bits. In such cases, this milling tool can be let down through the casing, and the offending boulder or shelf quickly cut away so that the casing may be lowered past the obstruction.

Frequently many different horizons are passed in drilling for oil. With the present methods only one sand can be safely produced from in a well. Many oil fields have three or four different wells only a few feet apart, each well going to a different sand. It is entirely feasible to cement this string of casing on top of the bottom sand and then by using this milling tool to mill the casing away from each of the other producing horizons, and then by using a rotary reamer to cut away any cement which the milling tool might not reach, and open up each pay formation to a diameter of 36" to 48" one string wells may be made which will get all of the oil from each horizon. This will, as stated, often save drilling two, three or more additional wells to reach the same oil that a well made, as above stated, will get. It will be noticed that the lower section of the outside teeth on the milling blades slope outwardly from the bottom up to where the teeth change directions.

The plug 23 may be removed to provide for circulation through the milling shoe or guide. It is to be noted that the plug and its opening are larger than the passages with which they are associated. This large opening for the plug insures the comparatively slow movement of the mud fluid past the threads with which the plug is engaged, thereby preventing damage to the threads which would occur if a small opening and plug were used since a small opening and plug would result in a rush of mud fluid past the threads thereby resulting in cutting and damaging the threads.

What I claim is:

1. A milling tool having a body portion, said body portion having an opening therein, and a plurality of fluid actuated milling blades operating in the opening, and pivoted to the body portion, and movable outwardly of the opening when subjected to pressure of the fluid on their inner sides, said blades having packing elements engageable with the wall of the opening, said blades having passages leading from the opening of the body portion to behind the packing elements whereby the pressure of the fluid expands the packing elements against the walls with which they coact.

2. A milling tool having a body portion, said body portion having a transverse opening extending entirely therethrough, a pair of fluid actuated milling blades normally confined within the opening, means for pivotally connecting one end of each milling blade to the body portion, the milling blades closing the opening at the points where the opening extends out through the periphery of the body portion, said milling blades being adapted to be projected outwardly of the opening when subjected to the pressure of the fluid at their inner sides, means for limiting the outward movement of the blades, and packing between the blades and the walls of the opening.

3. A milling tool having a body portion, a plurality of milling blades pivoted to the body portion, and means for swinging the blades outward, means for limiting the outward swinging movement of the blades, said blades having milling teeth on their outer faces and milling teeth on their bottom faces, the milling teeth on the outer face inclining downwardly and across the outer face in a direction to cause the cuttings to feed downwardly and to exert an upward thrust on the drill stem, the milling teeth on the bottom being inclined across the face of the bottom to cause the cuttings to feed outwardly between the well casing and the formation.

4. A milling tool comprising a body having a transverse opening defined by parallel walls, a pair of milling blades having their upper ends pivoted to the body portion, the milling blades operating in the opening of the body portion and having parallel side faces snugly fitting against the parallel walls of the opening, said side faces being slotted, packing strips in the slots of the side faces and engageable with the walls of the opening, fluid means for actuating said blades outwardly of the said opening, means for limiting the outward swinging movement of the blades, said blades having passages leading from the space between the blades to the bottom walls of the slots whereby the fluid acts to force the packing strips against the walls to enhance the packing action of the strips.

5. A milling tool having a body portion with an opening, a blade pivoted in the opening and being outwardly movable under the pressure of a fluid on the interior of the tool, said blade having slots in the sides confronting the sides of the opening, there being passages connecting the slots which have openings communicating with the interior of the tool, means to limit the outward movement of the blade, and packing elements situated in the slots.

6. A milling tool having a body portion with an opening, a blade pivoted in the opening and being extensible under the pressure of a fluid on the interior of the tool, means to limit the outward movement, said blade having slots extending diagonally thereof across the sides confronting the sides of the opening thereby to assume positions in substantial parallelism with the outer edges of the opening when the blade is extended, there being ducts affording communication of the interior of the tool with the slots, and packing strips situated in the slots.

7. A milling tool having a body portion with an opening and a stop flange, a blade pivoted in the opening having a lip that is engageable with the flange to limit the movement of the blade when extended by interior fluid pressure, said blade having slots in the sides confronting the sides of the opening and extending diagonally from the lip thus enabling the assumption of positions in substantial parallelism with the edges of the opening when the blade is extended, there being ducts affording communication of the slots with the interior of the tool, and packing strips located in the slots.

8. A milling blade having an outer face provided with teeth and an inner face from which openings extend to transverse passages within the blade, a lip extending beyond an end of the blade which end constitutes a lower face having teeth, the outer and lower faces merging with a toothed slope, the sides of the blade having slots extending from the lip and having communication with said openings.

9. In a milling tool, a cylindrical body portion, and a milling shoe carried by the body portion, diminishing in cross section toward one end of the shoe, having a cylindrical section larger than said body portion and having swedging webs on said cylindrical section to swedge out bends in a casing, said webs merging with and disappearing at the diminishing portion of the body.

10. A tool comprising a body to receive fluid under pressure and having an opening, a cutting element in the opening, and packing means carried by the cutting element adjoining the walls of the opening, the cutting element and the packing means respectively being moved in the opening to a cutting position and pressed against the walls of the opening by the fluid pressure.

11. A tool comprising a body to receive fluid under pressure and having an opening, a cutting element in the opening, and packing means actuated by the fluid pressure to make a tight joint between said element and the walls of the opening when said element is displaced in the opening by said fluid pressure.

ALEXANDER BOYNTON.